United States Patent
Kitagata

(10) Patent No.: US 9,589,216 B2
(45) Date of Patent: Mar. 7, 2017

(54) INFORMATION PROCESSING APPARATUS, DISTRIBUTED PRINTING SYSTEM, AND METHOD OF CONTROLLING PRINTING

(71) Applicant: CANON KABUSHIKI KAISHA, Tokyo (JP)

(72) Inventor: Kei Kitagata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/601,383

(22) Filed: Jan. 21, 2015

(65) Prior Publication Data
US 2015/0242161 A1    Aug. 27, 2015

(30) Foreign Application Priority Data
Feb. 26, 2014 (JP) .................. 2014-036000

(51) Int. Cl.
H04N 1/00 (2006.01)
G06F 3/12 (2006.01)
G06K 15/00 (2006.01)

(52) U.S. Cl.
CPC ......... *G06K 15/408* (2013.01); *G06F 3/1206* (2013.01); *G06F 3/1228* (2013.01); *G06F 3/1247* (2013.01); *G06F 3/1288* (2013.01)

(58) Field of Classification Search
CPC .... G06F 3/1206; G06F 3/1228; G06F 3/1244; G06F 3/1247; G06F 3/1248; G06F 3/128; G06F 3/1285; G06F 3/1288; G06F 3/1289; G06F 3/129; G06F 3/1298; G06F 3/067; G06F 9/5077; G06F 9/5066; G06F 15/167; G06K 15/408; G06K 15/181; G06K 15/1813; G06K 15/1814; G06K 2215/0042; G06K 2215/004; H04L 29/08549
USPC .... 358/1.11–1.18, 1.1; 718/1, 100, 102–106; 709/201–203, 213–215, 248
See application file for complete search history.

(56) References Cited

U.S. PATENT DOCUMENTS

| | | | | |
|---|---|---|---|---|
| 6,075,615 | A * | 6/2000 | Nakamura | G06F 3/1203 358/1.14 |
| 6,369,907 | B1 * | 4/2002 | Aoki | G06F 3/1204 358/1.15 |
| 7,538,902 | B2 | 5/2009 | Kurotsu et al. | |
| 7,719,703 | B2 | 5/2010 | Kurotsu et al. | |
| 8,531,711 | B2 | 9/2013 | Kitagata | |
| 8,693,022 | B2 * | 4/2014 | Bhatia | G06K 15/1859 358/1.14 |
| 2003/0084132 | A1 * | 5/2003 | Ohta | G06F 9/4411 709/221 |
| 2005/0206917 | A1 * | 9/2005 | Ferlitsch | G06K 15/02 358/1.5 |

(Continued)

FOREIGN PATENT DOCUMENTS

JP    2006-260216 A    9/2006
JP    2011-76226 A    4/2011

*Primary Examiner* — Chad Dickerson
(74) *Attorney, Agent, or Firm* — Fitzpatrick, Cella, Harper & Scinto

(57) ABSTRACT

The necessity of a printer object is determined based on data to be printed, and in a case where the data type is such that a conversion to a printer language is necessary, a printer object is dynamically generated. With this, a distributed printing system that does not use resource pointlessly and for which efficient scaling out is possible can be realized.

12 Claims, 12 Drawing Sheets

(56) References Cited

U.S. PATENT DOCUMENTS

| | | | | |
|---|---|---|---|---|
| 2007/0273923 A1* | 11/2007 | Kimura | .................. | G06F 3/122 358/1.15 |
| 2011/0075207 A1 | 3/2011 | Nakata | | |
| 2012/0081731 A1* | 4/2012 | Suzuki | .................. | G06F 3/1205 358/1.13 |
| 2012/0274979 A1* | 11/2012 | Uchida | .................. | H04L 69/08 358/1.15 |
| 2013/0188221 A1* | 7/2013 | Ohno | .................... | G06F 3/1296 358/1.15 |
| 2013/0202222 A1* | 8/2013 | Saito | .................... | G06F 3/1206 382/305 |
| 2015/0015908 A1* | 1/2015 | Tanaka | ............... | G06K 15/4095 358/1.14 |

* cited by examiner

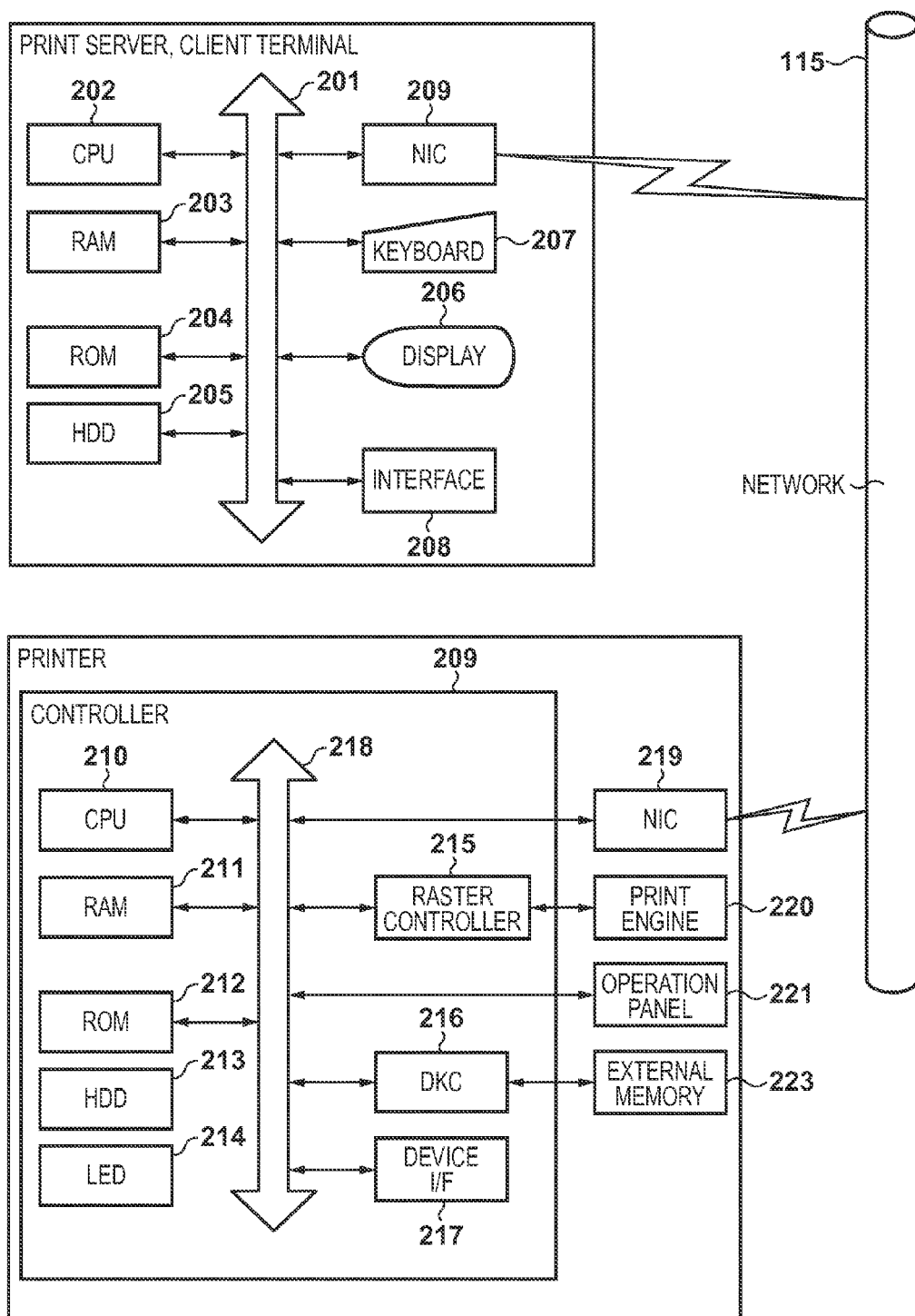

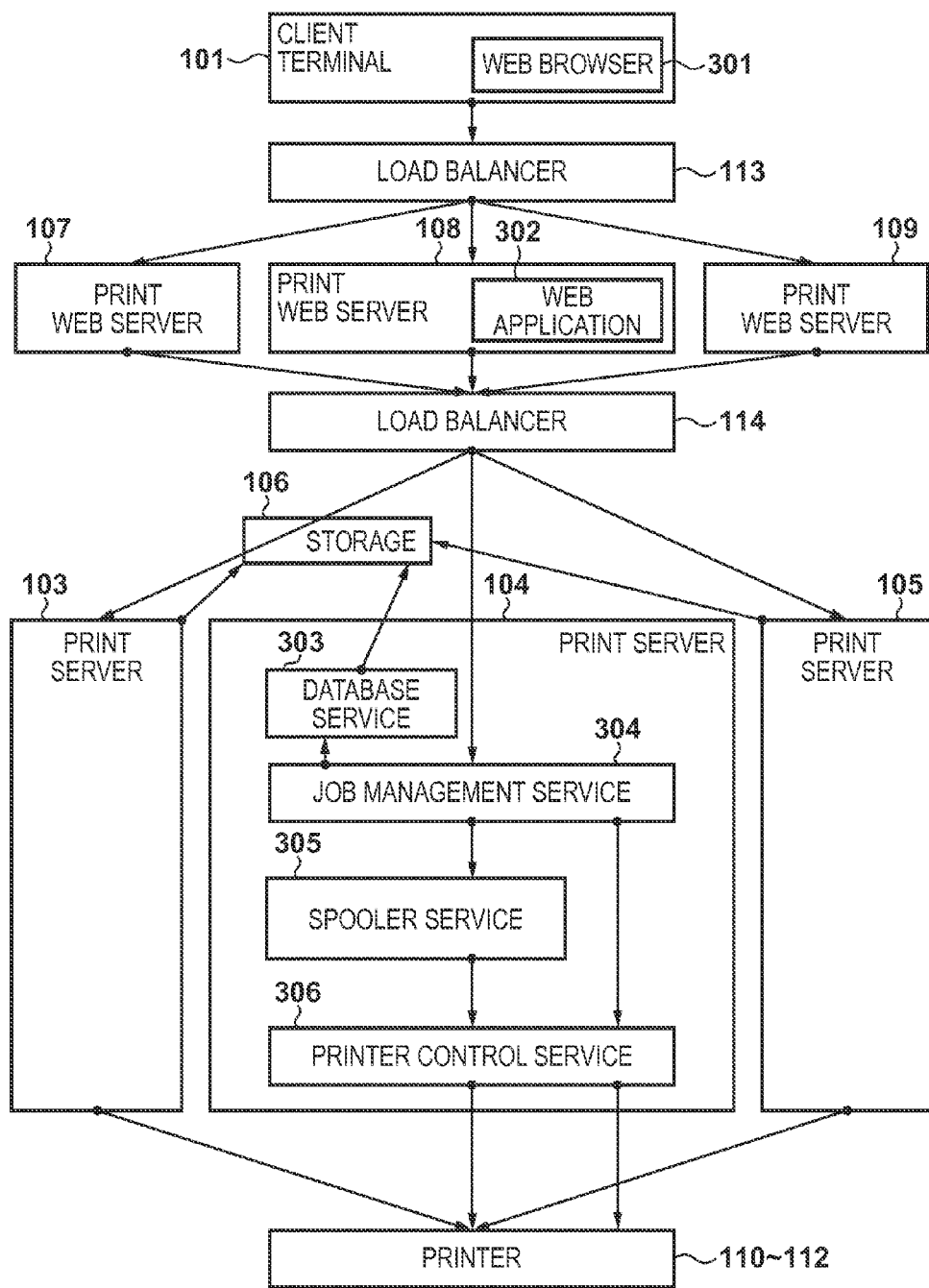

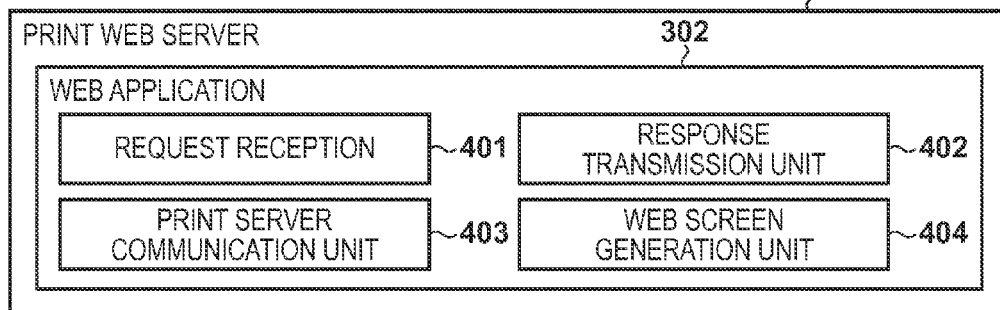
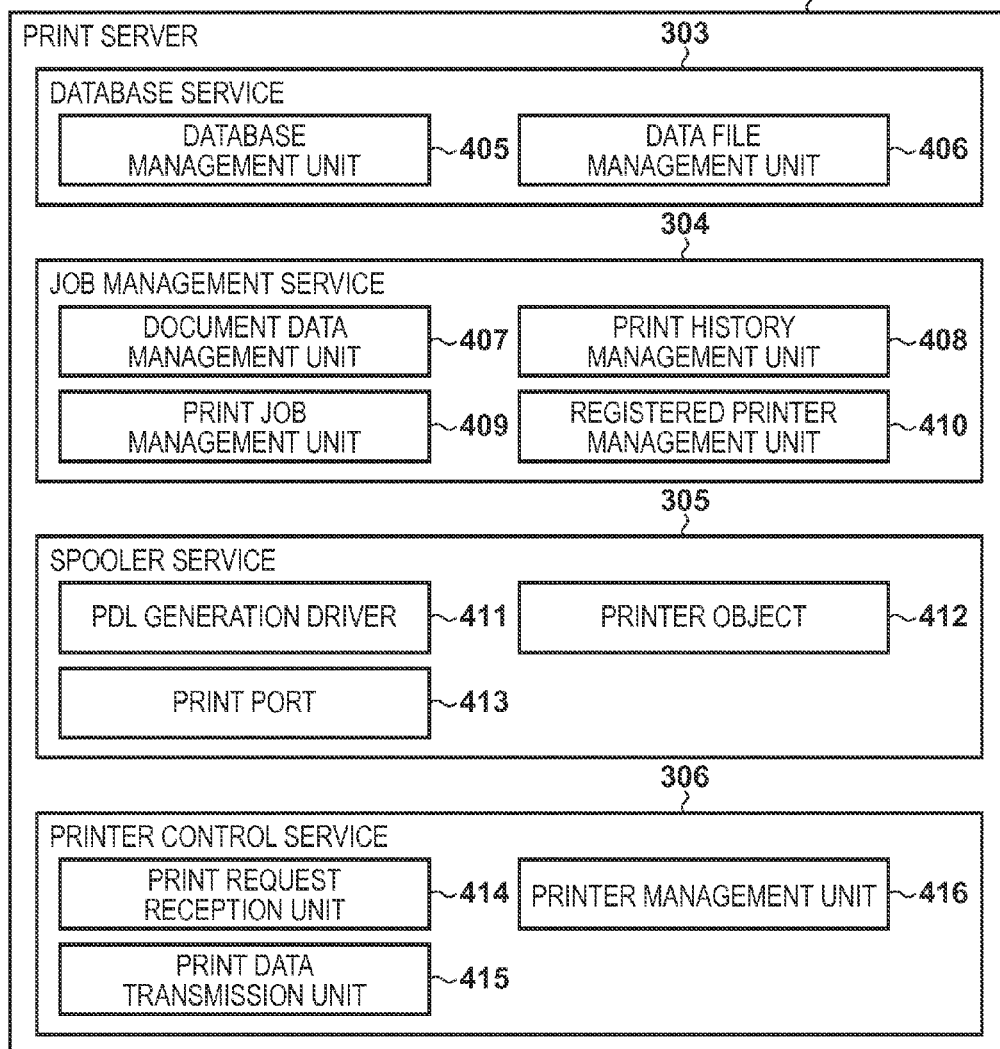

FIG. 5A

| 501 | DOCUMENT INFORMATION | | |
|---|---|---|---|
| 502 | DOCUMENT ID | ... | DOCUMENT ID |
| 503 | DOCUMENT NAME | ... | DOCUMENT NAME |
| 504 | DOCUMENT STATUS | ... | DOCUMENT STATUS |
| 505 | ENTRY TIME | ... | ENTRY TIME |
| 506 | DOCUMENT TYPE | ... | DOCUMENT TYPE |
| | : | ... | : |

FIG. 5B

| 511 | PRINT JOB INFORMATION | | |
|---|---|---|---|
| 512 | PRINT JOB ID | ... | PRINT JOB ID |
| 513 | STATUS | ... | STATUS |
| 514 | PRINT INITIATION DATE AND TIME | ... | PRINT INITIATION DATE AND TIME |
| 515 | PRINTER NAME | ... | PRINTER NAME |
| | : | ... | : |

FIG. 5C

| 521 | PRINT HISTORY INFORMATION | | |
|---|---|---|---|
| 522 | PRINT JOB ID | ... | PRINT JOB ID |
| 523 | COMPLETION STATUS | ... | COMPLETION STATUS |
| 524 | PRINT COMPLETION DATE AND TIME | ... | PRINT COMPLETION DATE AND TIME |
| 525 | PRINTER NAME | ... | PRINTER NAME |
| | : | ... | : |

F I G. 5D

| | PRINTER INFORMATION | | |
|---|---|---|---|
| 531 | PRINTER INFORMATION | | |
| 532 | PRINTER NAME | ... | PRINTER NAME |
| 533 | DRIVER NAME | ... | DRIVER NAME |
| 534 | PRINTER OBJECT NAME | ... | PRINTER OBJECT NAME |
| 535 | PORT NAME | ... | PORT NAME |
| 536 | IP ADDRESS, HOST NAME | ... | IP ADDRESS, HOST NAME |
| 537 | MODEL NAME | ... | MODEL NAME |
| 538 | EXISTENCE OR ABSENCE OF PDF DIRECT PRINT FUNCTION | ... | EXISTENCE OR ABSENCE OF PDF DIRECT PRINT FUNCTION |
| | : | ... | : |

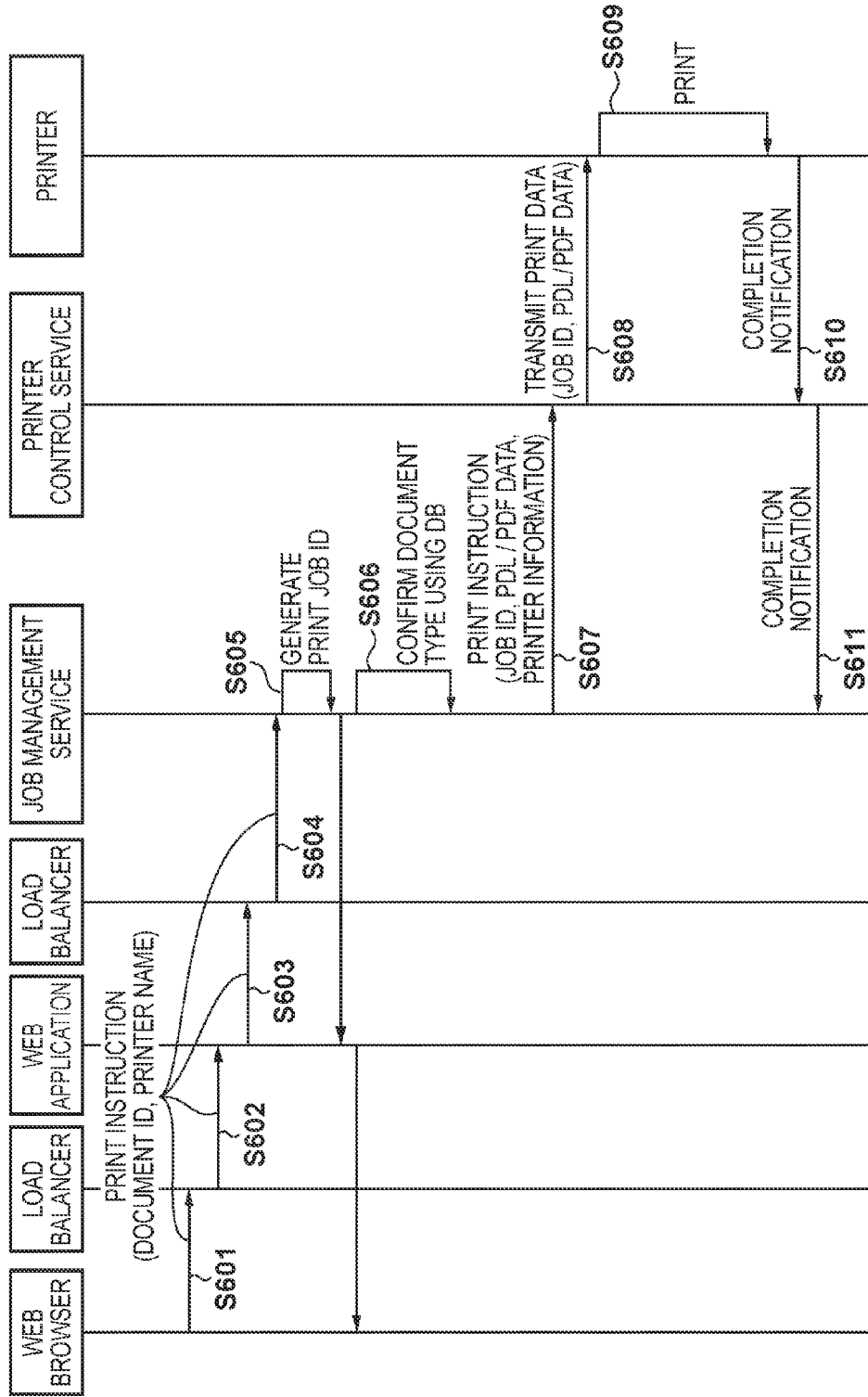

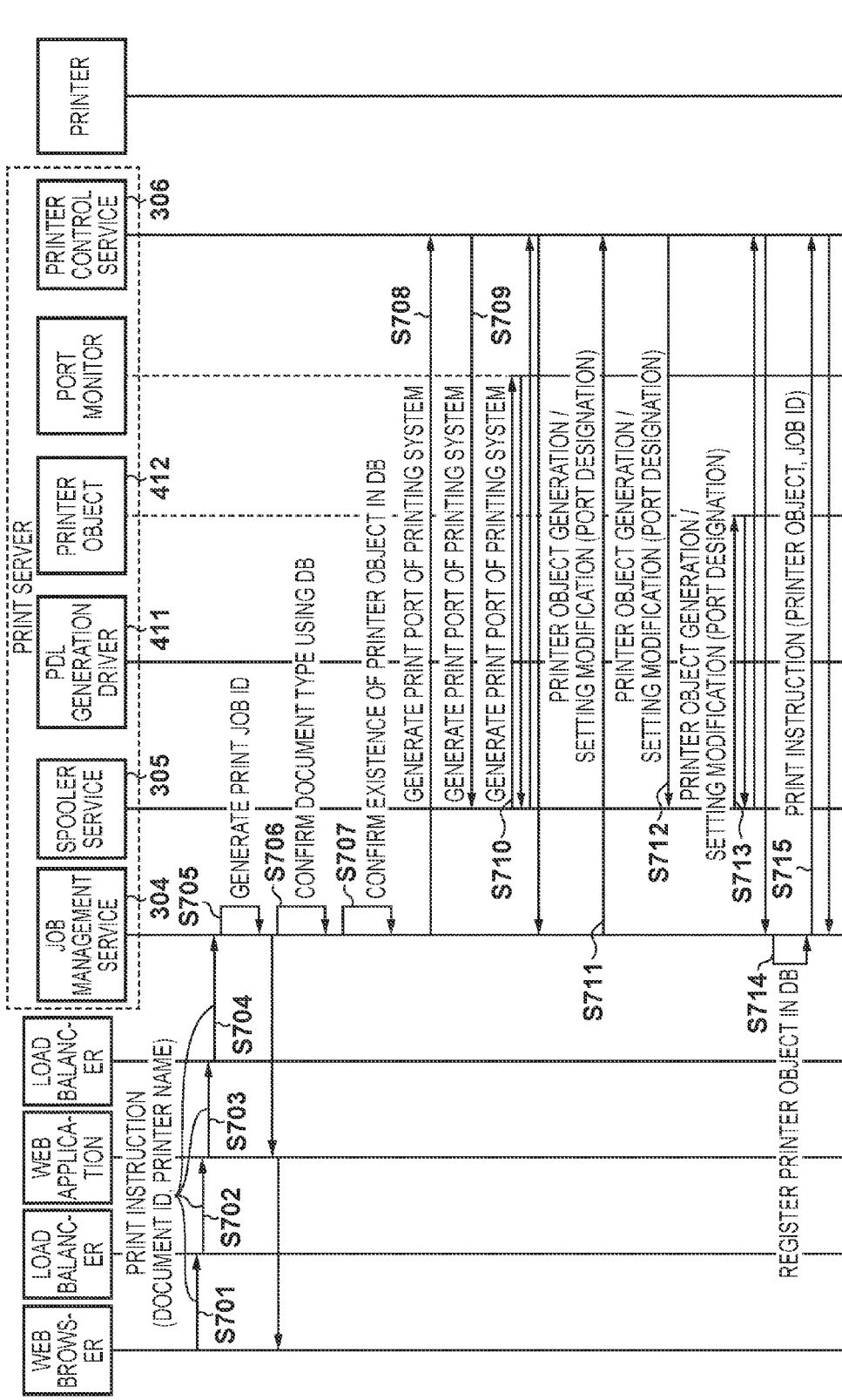

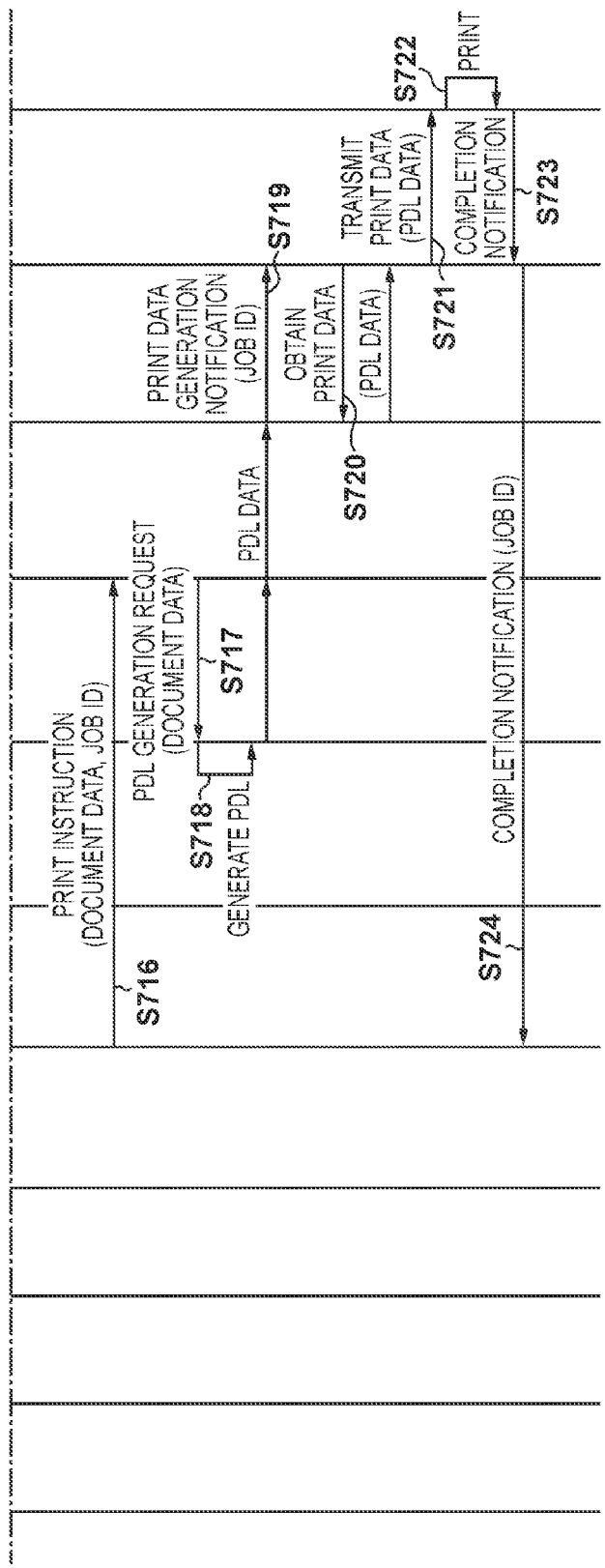

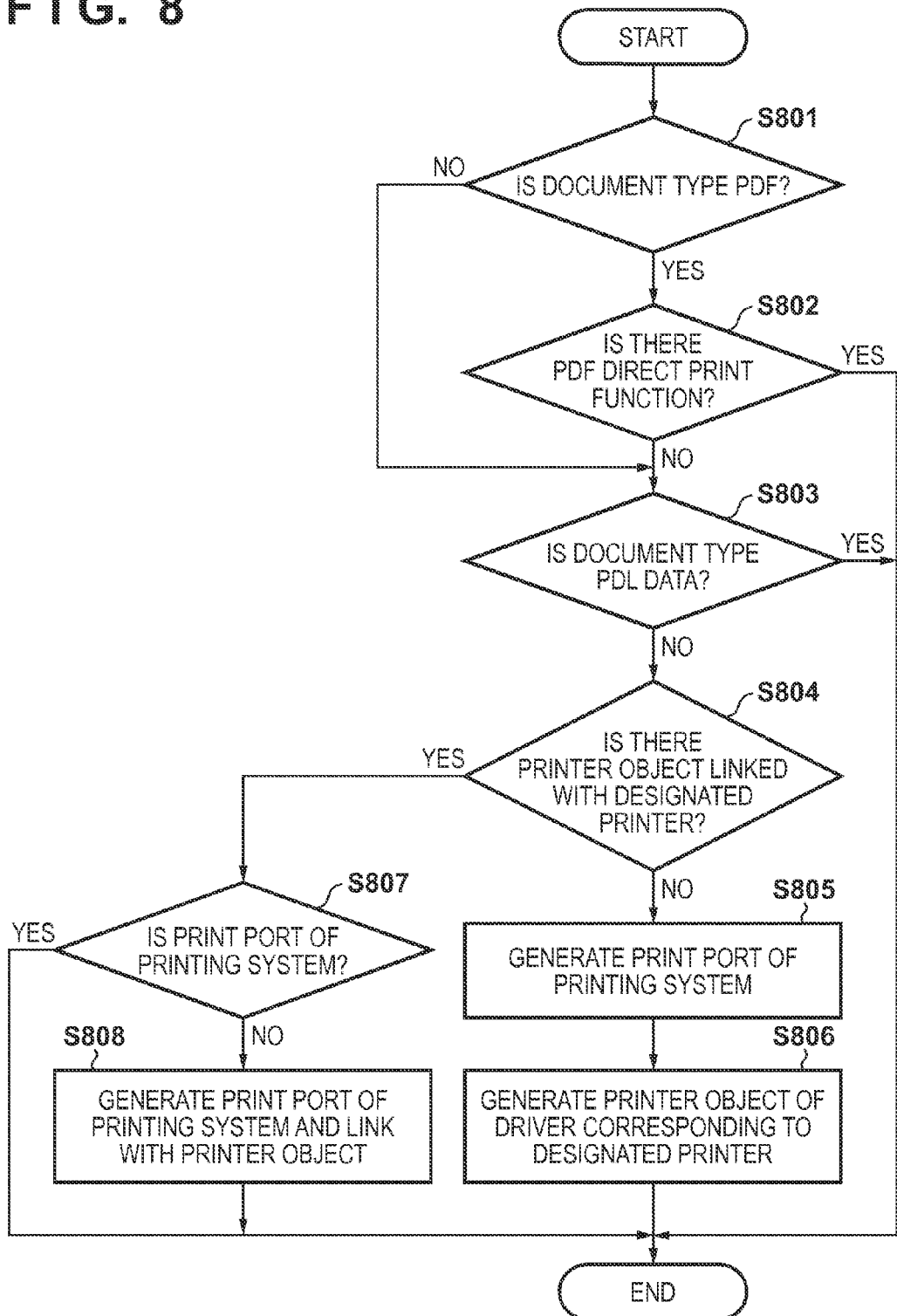

FIG. 9A

| 531 | PRINTER INFORMATION | | |
|---|---|---|---|
| 532 | PRINTER NAME | ... | PRINTER NAME |
| 533 | DRIVER NAME | ... | DRIVER NAME |
| 534 | PRINTER OBJECT NAME | ... | PRINTER OBJECT NAME |
| 535 | PORT NAME | ... | PORT NAME |
| 536 | IP ADDRESS, HOST NAME | ... | IP ADDRESS, HOST NAME |
| 537 | MODEL NAME | ... | MODEL NAME |
| 538 | EXISTENCE OR ABSENCE OF PDF DIRECT PRINT FUNCTION | ... | EXISTENCE OR ABSENCE OF PDF DIRECT PRINT FUNCTION |
| 901 | DELETION FLAG | ... | DELETION FLAG |
| | : | ... | : |

FIG. 9B

| 911 | DELETED PRINTER OBJECT INFORMATION | | |
|---|---|---|---|
| 912 | PRINTER OBJECT NAME | ... | PRINTER OBJECT NAME |
| | : | ... | : |

INFORMATION PROCESSING APPARATUS, DISTRIBUTED PRINTING SYSTEM, AND METHOD OF CONTROLLING PRINTING

BACKGROUND OF THE INVENTION

Field of the Invention

The present invention relates to an information processing apparatus, a distributed printing system, and a method of controlling printing.

Description of the Related Art

Regarding print servers that handles print jobs collectively on the server in response to print requests from a plurality of client terminals, distributed printing systems deploying a plurality of print servers that perform print processing distributively on the server have been realized. In this kind of a distributed printing system, print processing load distribution is realized by dividing printers that handle printing among the print servers and managing them. By taking a configuration in which the servers are distributed, it is possible for a print server to handle a large number of print jobs, and furthermore, a configuration in which servers are redundant, wherein, in a case where an abnormality occurs in an operational state of a specific print server, it is possible for another print server to continue performance of the printing has been realized. For a processing distribution technique of a system for performing output of document data, or the like, through a plurality of processing apparatuses installed distributively in this way, in Japanese Patent Laid-Open No. 2006-260216, a technique has been proposed in which printer allocation to the print servers is managed, and an allocation of printer object (or a logical printer) to print servers is modified, for example, based on the operational state and the load conditions of the print servers and the printers. Note, a printer object (i.e. a logical printer) is a printer from the perspective of printer server software, and by providing a message including data, an instruction, or the like, to a designated printer object, printing is executed by the printer (or a virtual printer) corresponding to the printer object. A technique of generating this kind of logical printer by software, and performing printing through the logical printer is provided by, for example, a Windows (registered trademark) operating system, but this is not limited to Windows.

Also, normally, a printer object that corresponds to a printer driver is necessary in order to convert, prior to sending print data to the printer, the document data that is handled by the print servers into a printer language that the printer can interpret using the printer driver. It is common to generate printer objects beforehand for the print servers, and to print using those printer objects upon printing. However, as a technique for dynamically generating printer objects and performing printing has been proposed in Japanese Patent Laid-Open No. 2011-76226. Here, a method is proposed in which whenever printing is performed using a printer for which a printer driver is not installed, a printer object corresponding to a dedicated printer driver is automatically generated.

For distributed print servers to be capable of being easily scaled out, it is necessary to register printer objects for each printer driver corresponding to the printers beforehand to each of the plurality of print servers in order to convert print data into a printer language. However, whenever the number of servers is increased in such a case, it takes a large amount of work to register the printer objects to each print server. Also, registering the maximum number of necessary printer objects beforehand adds a large load to a spooler service because unnecessary resources are registered to the servers even in a case of printing in which conversion into a printer language based on the type of the print data is not necessary and the printer object is not used. Also, Japanese Patent Laid-Open No. 2011-76226 is a technique for registering printer objects dynamically, but in this technique a printer object is registered dynamically within a single server, and realizing dynamic printer object registration in a distributed server configuration is difficult.

Also, the technique for distributing servers and modifying the allocation of printer objects dynamically recited in Japanese Patent Laid-Open No. 2006-260216, the allocation of the printer that each server handles is determined, and it is difficult to easily modify the server configuration in order to scale out the servers in response to an increase in the amount of printing.

SUMMARY OF THE INVENTION

The present invention provides a distributed printing system that does not use resources pointlessly and for which efficient scaling out is possible.

The present invention is provided with the following configuration.

According to the present invention, there is provided an information processing apparatus for, making, by going through or without going through a printer object corresponding to a printer provided by a system, an instruction for printing by the printer, the apparatus comprising: a first determination unit that determines whether or not document data to be printed is printable without going through a printer object corresponding to a designated printer; a second determination unit that, in a case where it is determined by the first determination unit that the document data is not printable without going through the printer object, determines whether or not the printer object corresponding to the designated printer exists; and a unit that, in a case where it is determined by the second determination unit that the printer object corresponding to the designated printer does not exist, causes the printer object to be generated by the system.

By virtue of the present invention, a distributed printing system in which resources are not used pointlessly and efficient scaling out is possible can be realized by generating a printer object dynamically and performing printing in a case where the necessity of a printer object is determined based on the data to be printed, and it is determined that the printer object is necessary for the data type.

Further features of the present invention will become apparent from the following description of exemplary embodiments (with reference to the attached drawings).

BRIEF DESCRIPTION OF THE DRAWINGS

FIG. 2 is a hardware configuration diagram for a print server, a client terminal, and a printer.

FIG. 3 is a module configuration diagram for print servers and print Web servers.

FIG. 4A is a software configuration diagram for the print Web servers.

FIG. 4B is a software configuration diagram for the print servers.

FIG. 5A is a configuration diagram for document information managed on the print servers.

FIG. 5B is a configuration diagram for print job information managed on the print servers.

FIG. 5C is a configuration diagram for print history information managed on the print servers.

FIG. 5D is a configuration diagram for printer information managed on the print servers.

FIG. 6 is a sequence diagram for printing of a document type for which a printer object is not necessary.

FIGS. 7A and 7B show a sequence diagram for printing of a document type for which a printer object is necessary.

FIG. 8 is a flow for generation of a printer object.

FIG. 9A and FIG. 9B are configuration diagrams for printer deletion information.

DESCRIPTION OF THE EMBODIMENTS

Hereinafter, embodiments for working the present invention are explained using drawings.

First Embodiment

Distributed Printing System Configuration

Figure 1:
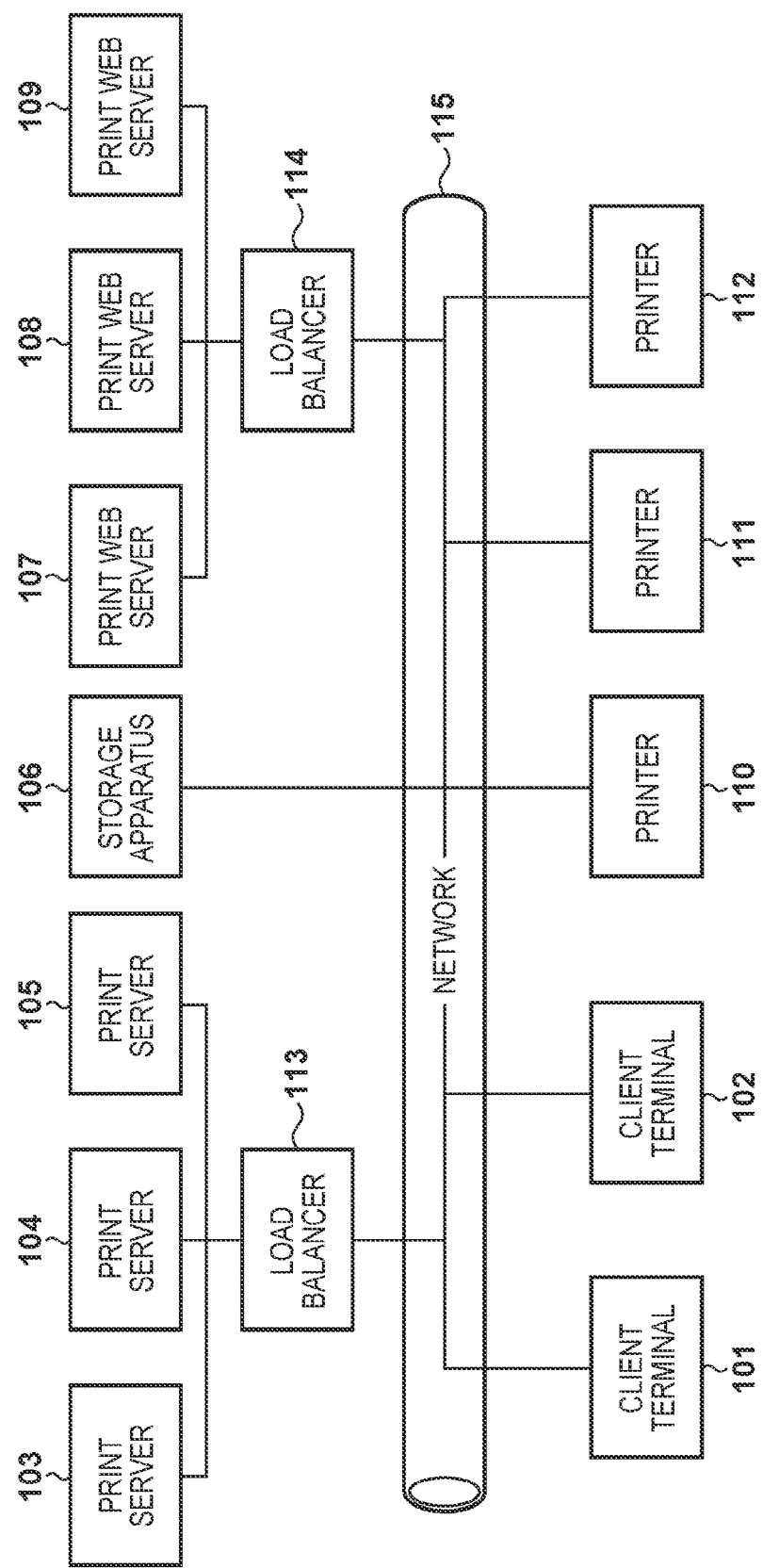
FIG. 1 is a block diagram for showing a network configuration.

FIG. 1 is a view for showing an overall configuration of a printing system according to embodiments of present invention.

In FIG. 1, client terminals 101 and 102, print servers 103-105, a storage apparatus 106, print Web servers 107-109, printers 110-112, and load balancers 113-114 are connected through a network 115. In the view, the client terminals 101 and 102, the print servers 103-105, the print Web servers 107-109, the printers 110-112, and the load balancers 113-114 are assumed to be multiply connected. The client terminals 101 and 102, the print servers 103-105, the print Web servers 107-109, and the load balancers 113-114 are realized by installing software in a general-purpose computer in accordance with respective functions, for example. The network 115 is, for example, any one of a LAN such as the Internet, a WAN, a telephone line, a dedicated digital line, an ATM or a frame relay line, a cable TV line, a wireless line for data broadcast, or the like. Also the network 115 may be realized by a combination of these, in a so-called communication network. Anything would be fine for the network 115 if transmission/reception of data is possible. Also, a way of communicating from the client terminals 101 and 102 to the print Web servers 107-109 through the load balancer 114 may be different from a way of communicating from the print servers 103-105 to the printers 110-112. The client terminals 101 and 102 are, for example, desktop personal computers, notebook computers, mobile terminals, PDAs (Personal Data Assistants), or the like, but may also be cellular phones which comprise built-in program execution environments. An environment for executing a program such as a Web browser (Internet browser, WWW browser, browser for using the World Wide Web) is built into the client terminals 101 and 102. The print Web servers 107-109 receive information that identifies a document to be printed, an output destination printer, and a print request (or a print instruction) through the load balancer 114 from the Web browser of the client terminals 101 and 102. The load balancer 114 distributes a request received from the client terminals 101 and 102 to the print Web servers 107-109 using an equivalent number of servers, or, and equivalent number of connections, or, an equivalent amount of data communication, or a distribution to the server with short response time, or a distribution approach such as a round robin. Also, the load balancer 113 distributes processing requests from the print Web servers 107-109 to the print servers 103-105 using the distribution approach previously described. The print servers 103-105 convert document data to print data in accordance with a processing request received from the print Web servers 107-109, and transmit the print data to the printers 110-112. Otherwise, depending on a document type of document data, the print servers 103-105 transmit document data itself to the printers 110-112 without converting to print data. The printers 110-112 perform printing upon receiving the print data or the document data from the print servers 103-105. A storage 106 is a data storage area comprising a storage apparatus such as a hard disk drive (HDD) or a solid state drive (SSD), and a network connection storage such as an NAS (Network Attached Storage). The print servers 103-105 maintain the document data input by other services or other programs as a file in the storage 106. Also, the print servers 103-105 maintain the later described document information 501, print job information 511, print history information 521, and printer information 531 in a database in the storage 106. A PDF (Portable Document Format), a PDL (Page Description Language), or an application data format is used for a document type 506 of the document data. The document type 506 is maintained in the document information 501.

<Server and Client Hardware>

FIG. 2 is a hardware configuration diagram of the client terminals 101 and 102, the print servers 103-105, the print Web servers 107-109, and the printers 110-112 in the printing system according to embodiments of the present invention. In FIG. 2, a CPU 202 for performing overall control of the apparatus executes an application program, OS, or the like, stored in a hard disk (HDD) 205, and performs control of temporarily storing information, a file, or the like, required for execution of the program in a RAM 203. Within a ROM 204 functioning as a storage unit, a program such as a basic I/O program, print data to be used upon print processing, or various data such as printer information is stored. The RAM 203, which functions as a temporary storage unit, serves as a main memory of the CPU 202, a work area, or the like. The hard disk (HDD) 205 is one external storage unit, and serves as a large capacity memory. The hard disk (HDD) 205 stores an application program such as a Web browser, a print server program, a print Web server, an OS, related programs, or the like. A display 206 is a display unit that displays a command inputted from a keyboard 207, document information received by the print servers 103-105, or the like. An external apparatus I/F 208 is an I/F for connecting a printer, a USB device, or a peripheral device. A keyboard 207 is a keyboard functioning as an instruction input unit. The system bus 201 is responsible for a flow of data in the print servers of the printing system. Regarding a network interface card (NIC) 209, data exchange is performed with an external apparatus through this interface 209 and the network 115. Note, the above described computer configuration is just an example, and limitation is not made to the example configuration in FIG. 2. For example, it is possible to modify the storage destination of data or programs to be the ROM, the RAM, or the HDD in accordance with features.

Also, a controller 209 in the printers 110-112 is a device which controls a control system of the printer. A CPU 210 which performs control of overall apparatus of the printer controls access to each kind of device connected to a system bus 218 comprehensively. The control is based on a control program stored in the ROM 212 or a control program stored in an external memory 223 connected through a disk controller (a DKC 216), or resource data (resource information). A RAM 211 serves as a main memory of the CPU 210, a work area, or the like. The RAM 211 is configured such that it is possible to extend the memory capacity by an option RAM connected to an expansion port (not shown). An external storage unit 213 functions as a large capacity memory, and stores related programs, or the like. Buttons and a display unit such as a liquid crystal panel or an LED 214 for performing a display of a setting such as that of an operation mode of the printers 110-112 or an operation status of the printers 110-112, and an operation such as a copying designation, are arranged on an operation panel (operation unit) 221. Regarding a network interface card (NIC) 219, data exchange is performed with an external apparatus through the interface 219. Note, a print engine 220 indicated in the figure utilizes a conventional printing technique, and for example an electrophotographic printing approach (a laser beam approach) or an ink-jet approach, a sublimation type (thermal transfer) approach, or the like, are given as suitable embodiments. A raster controller 215 is a controller for converting print data which is of the PDL language or the PDF language to image data. A device I/F 217 is a connection I/F for an external device which is connectable using such as by USB.

Here, explanation will be given for processing where a printer is registered to a printing system, processing where document data input to the printing system from another service or another program is held, and processing where the print servers 103-105 transmit the print data to the printer in response to a print request sent from a Web browser 301 by a user operation and printing is performed, using FIG. 3, FIG. 4A, FIG. 4B, FIG. 5A-FIG. 5D. FIG. 3 illustrates a flow of processing starting with a print request from a client terminal, and going until printing is performed by a printer, FIG. 4A and FIG. 4B illustrate functional blocks of the print Web servers and the print servers respectively, and FIG. 5A-FIG. 5D illustrate the details of various information managed by a job management service 304 in the print server and stored by a database management unit 405. Actual printing systems include the print servers 103-105 in a distributed configuration which is capable of being scaled out, where both the load balancers 113 and 114 are arranged in stages preceding the print Web servers 107-109 and the print servers 103-105 respectively, and configuration is taken such that all of requests are distributed and one of the print Web servers 107-109 or one of the print servers 103-105 receives the request. The document information 501, the print job information 511, the print history information 521, and the printer information 531, which is managed by the print servers 103-105 are held in the storage 106 and can be accessed as shared information from each of the print servers 103-105. However, a printer object 412 of a spooler service 305 managed under the print servers 103-105 and each resource of a print port 413 is managed by each of the print servers 103-105.

<Printer Registration Processing>

Firstly, explanation will be given for processing for registering a printer to a printing system, in other words processing for registering a printer to a print server. For example in a case where a printer is newly added to the printing system, the information (printer information) relating to the printer is registered to the print server. For this, when the printer information is designated by the Web browser 301 by a user operation, the information is received by a Web application 302 of the print Web servers 107-109 distributed by the load balancer 113. In the printer information, information such as a printer name, a driver name, a printer object name, a port name, an IP address/host name, a model name, or an existence or absence of a PDF direct print indicating the existence or absence of a PDF direct print function is included. The PDF direct print function is a function for the printer to print document data in the PDF format as is. In detail, designated printer information is received by the request reception unit 401 of the Web application 302, and the received printer information is sent to the print server communication unit 403. The print server communication unit 403 transmits the printer information to the job management service 304 of the print servers 103-105 distributed by the load balancer 114. The sent printer information is received by a registered printer management unit 410 of the job management service 304. The registered printer management unit 410 transmits the received printer information to the database management unit 405 of a database service 303. The database management unit 405 confirms whether a printer name 532 of the received printer information is already registered in the database, and in a case where it is not registered, the printer information is stored as new printer information 531 in the database of the storage 106. Information of the printer name 532, a driver name 533, an IP address or host name 536, a model name 537, and an existence or absence of a PDF direct print function 538 is included in the printer information 531. The printer name 532 is a character sequence unique in the system. The existence or absence of a PDF direct print function 538 is a flag illustrating whether or not the PDF direct print function which is an option function of the printer is equipped. In a case where its value is true, it is possible to print by sending a PDF file to the printer directly without going through a driver. In a case where its value is false, the PDF file is converted to a PDL by a driver, transmitted to the printer, and printed. Here, a printer object name is identification information of a printer object, i.e. a logical printer. The printer object is a software printer from the viewpoint of the printer server, i.e. a logical printer, and upon printing using the driver, by providing a message including data, an instruction, or the like, to the identified printer object, i.e. the logical printer, printing is executed by the printer corresponding to the printer object. Also, designated print settings are associated with, or included in, the printer object beforehand, and the print settings are designated, in addition to the printer to be used, by designating the printer object. The print settings can be modified, and the term printer here includes a virtual printer realized by software. Also, the driver corresponding to the printer is assumed to be installed in advance in the present example. Because the driver has a function for converting application data into PDL, even if the printers 110-112 are printers of a plurality of models, so long as they support the same PDL (page description language), the can use a common driver. Up until this point has been explanation of the processing for registering a printer to the printing system.

<Document Data Input and Holding>

Next, explanation will be given below for processing by which the print servers 103-105 hold document data input from other services in the printing system or from other programs. In the printing system, document data, and a document name 503 and the document type 506 (which are document information) that are input from another service or another program are received by the Web application 302 of one of the print Web servers 107-109 to which they are distributed by the load balancer 113. The document type is a type of the document data, and is information indicating that the document is a PDF file, for example. Of course, the information indicated is not limited to the PDF file, and is information for distinguishing documents that can be printed independently on a printer without using a printer driver, such as a JPEG file, for example, and documents that cannot be. In detail, the request reception unit 401 of the Web application 302 receives the document data or the document information, and transmits this received document data and document information to the print server communication unit 403. The print server communication unit 403 transmits the document data and the document information to the job management service 304 of one the print servers 103-105 to which it is distributed by the load balancer 114. The sent document data and document information is received by a document data management unit 407 of the job management service 304. The document data management unit 407 issues a document ID 502 and generates the document information 501 with the document name 503, the document type 506, an entry time 505, and "ready" for a document status 504. For the document status 504, there are "ready", "print scheduled", "printing", "printed", "error termination", "cancel termination", or the like. Also, the previously described document information 501 is displayed as document information list information by the Web browser 301. The document data management unit 407 sends the document information 501 to the database management unit 405 of the database service 303. The database management unit 405, having received the document information 501, stores the document information 501 in a database of the storage 106. Also, the document data management unit 407 sends the document data to the data file management unit 406 of the database service 309. The data file management unit 406 stores the received document data in a file system of the storage 106. Here, the database service 303 manages the document data and the document information 501, the print job information 511, the print history information 521, and the printer information 531 in the storage 106. The storage 106 is commonly managed from each of the database services 303 of the print servers 103-105 which are divided into a plurality. Up until here has been explanation of processing for the print servers 103-105 storing the document data input from another service or another program in the printing system.

<Print Processing>

Next, explanation will be given with reference to the sequence diagrams of FIGS. 6 and 7 for the procedure of processing, i.e. the print control procedure by which the print servers 103-105 perform printing by transmitting print data to a printer for a print request sent from the Web browser 301 due to a user operation. FIG. 6 is a print sequence that does not go through a spooler service due to the document type, and FIGS. 7A and 7B show a sequence diagram that performs a print through the spooler service due to the document type. Additionally, the drawings are separate, but as will be later described, the processing may be branched from step S606 and step S706 in accordance with conditions. Also, in FIGS. 7A and 7B, a PDL generation driver 411, the printer object 412, and the print port 413 are described as the same level as the spooler service 305 which includes them, but this is for convenience of explanation, and the spooler service 305 of FIGS. 7A and 7B represents functions by modules other than the PDL generation driver 411, the printer object 412, and the print port 413. Also, a port monitor of FIGS. 7A and 7B is not shown graphically in FIG. 4A or FIG. 4B, but is provided by an operating system such as Windows (registered trademark), for example, and the port monitor has functions for generating or deleting the print port 413 in accordance with a request. This is not limited to Windows (registered trademark), and similar functions are supported even on other operating systems.

In step S601 and in step S701 the load balancer 114 receives a print request from the Web browser 301. In the print request, identification information of a document data ID and a printer name of a printing target that the user designates from a document list and a printer list displayed on the Web browser 301 are respectively included. In step S602 and in step S702, the load balancer 114 distributes the print request, and the request reception unit 401 of the Web application 302 on the print Web server to which the print request is distributed receives the print request. In step S603 and in step S703, the Web application 302 receives the document ID 502 and the printer name 532 included in the print request from the Web browser 301. The request reception unit 401 sends to the print server communication unit 403 the received document ID 502 and printer name 532. In step S603 and in step S703, the print server communication unit 403 transmits the print instruction including the document ID 502 and the printer name 532 to the load balancer 114. In step S604 and in step S704, the load balancer 114, in accordance with a load on a print server, distributes the print instruction, and transmits the print instruction to the job management service 304 of one of the print servers 103-105. In the job management service 304, the document data management unit 407 receives this data. A Web screen generation unit 404 generates a screen for showing that the print request is received, and through a response transmission unit 402 returns a response screen to the Web browser 301.

The document data management unit 407 of the job management service 304 that received the print request obtains the document information 501 from the database management unit 405 based on the document ID 502. More specifically, it obtains the document information included in the document ID included in the print request. Also, the document data management unit 407, in a case where the document information 501 can be obtained, obtains document data linked to the document ID 502 from a data file management unit 406. Then, the document data management unit 407 sends the document information 501, the printer name 532, and the document data to a print job management unit 409. The document data management unit 407 sends a modification request to the database management unit 405 in order to modify the status 504 of the document information 501 to "print scheduled". The database management unit 405 modifies the status 504 of the document information 501 to "print scheduled". Next, the print job management unit 409, having received the document information 501, the printer name 532, and the document data, generates the print job information 511. Here, the print job management unit 409, in step S605 and in step S705, issues a print job ID 512, and registers a new print job into the print job information 511. Then, a status 513 of the print job information registered newly, set to "spool wait". Here the value of the status 513 is the value "spool wait", "waiting to be scheduled", "transferring", "transferred", "printing", or the like. Then, a print initiation date and time 514 and a printer name 515 are set, and the print job information 511 is sent to the database management unit 405. In the database management unit 405, this information is stored in the storage 106.

Next, the print job management unit 409 confirms the document type 506 from the document information 501 of the printing target in step S606 and in step S706. In other words, the document type 506 is referenced, and the printer driver determines whether or not it is the required document data, or more specifically whether it is PDF or PDL (however, it is limited to PDL which is processable by a designated printer). In a case of PDF, the print job management unit 409 passes the printer name 532 to the registered printer management unit 410 and obtains the printer information 531. The registered printer management unit 410 obtains the printer information 531 based on the printer name 532 from the database management unit 405, and passes it to the print job management unit 409. Then, the print job management unit 409 determines the existence or absence of a PDF direct print function 538 of the printer information 531. Here, if the printing target is a PDF document, and there is the PDF direct print function, processing is executed from step S607 of FIG. 6. On the other hand, when the printing target document is not PDF or there is no PDF direct print function, the processing is executed from step S707 of FIG. 7A.

In a case where the printing target is the PDF document and there is the PDF direct print function in the printer to be used, or the document type 506 is PDL, the print job management unit 409, in step S607, sends the document data, the print job ID 512, and the printer information 531 to a print request reception unit 414 of a printer control service 306. Also, in step S607, in a case where the document type 506 is PDL, the print job management unit 409 sends the document data, the print job ID 512, and the printer information 531 to the print request reception unit 414 of the printer control service 306.

The print request reception unit 414 of the printer control service 306, having received the print request (print instruction) including PDL document data or PDF document data, the print job ID 512 and the printer information 531 from the print job management unit 409 in step S607, and transfers that document data to one the printers 110-112 through the print data transmission unit 415 in step S608. One of the printers 110-112, having received the data, performs printing in step S609. Then, a print control service 306 notifies the print job management unit 409 of this state. The print job management unit 409, through the database management unit 405, modifies in turn the status 513 of the print job information 511 to "waiting to be scheduled" (the state prior to transferring the data to the printers 110-112), "transferring", "transferred", and "printing".

Meanwhile, in a case where in step S606 and in step S706, the document type 506 is not PDL data (for example, it is an application data format), or it is PDF but the PDF direct print function is not in the designated printer, the following processing is performed. In a case where a printer object name 534 of the printer information 531 of the designated printer is empty in step S707, i.e. in a case where for the spooler service 305, the printer object 412 of the designated printer does not exist, the print job management unit 409, in step S708, outputs a new a printing system print port generation request to a printer management unit 416 of the printer control service 306. In step S709, the printer management unit 416 outputs the print port generation request of the printing system to the spooler service 305. In step S710, the spooler service 305 generates the print port 413 of the printing system. Then, in step S711, the print job management unit 409 sends a registration request for the printer object 412 corresponding to the designated printer to the printer management unit 416 of the printer control service 306. In step S712, the printer management unit 416 sends to the spooler service 305 the registration request for the printer object 412 linked to the generated print port of the printing system. In step S713, the spooler service 305 generates the printer object 412 linked to the designated print port of the printing system. Generation of the printer object is one of the functions provided by the operating system which may be Windows (registered trademark), for example. The spooler service 305 responds to the printer control service 306 that the printer object corresponding to the designated printer is generated. In the printer control service 306, having received the response, the print job management unit 409 of the printer control service 306 sends the name of the registered printer object 412 to the registered printer management unit 410 in step S714. The registered printer management unit 410 registers the name of the printer object 412 through the database management unit 405 into the printer object name 534 of the printer information 531.

Here, in a case where it is determined in step S707 that there is the printer object name 534 in the printer information 531, i.e. in a case where the printer object 412 exists for the spooler service 305, the print job management unit 409 obtains information of the print port linked to the printer object name 534 from the spooler service 305 through the printer management unit 416. The print job management unit 409 determines whether the print port is the print port 413 of the printing system from the obtained print port information. In a case where it is not the print port 413 of the printing system, the print job management unit 409, in step S708, outputs a generation request for the print port 413 of the printing system to the spooler service 305 in the printer management unit 416. In step S709, the printer management unit 416 outputs the print port 413 generation request of the printing system to the spooler service 305. The spooler service 305, in step S710, performs generation of the print port 413. Then, in step S711, the print job management unit 409 outputs a setting modification request to link the printer object 412 to the print port generated by the spooler service 305 to the printer management unit 416. Furthermore, in step S712, the printer management unit 416 outputs to the spooler service 305 a setting modification request to link the print port to the printer object 412. In step S713, the spooler service 305 outputs a print port setting modification request to the printer object 412. Then, the printer object 412 links the print port to the printer object 412.

Here, in a case where there is the printer object name 534 in the previously described step S707, the printer object 412 that coincides with the printer object name 534 exists for the spooler service 305. However, there are cases in which the printer object 412 is not the print port 413 of the printing system. This is a case where a user, in order for the user to use a print attribute that is directly settable in the printer object 412, manually registers the printer object 412 rather than the printer object 412 being generated automatically by the printing system. In such a case, the user registers by designating a port registered by default in the OS as the print port corresponding to the printer object 412 of the designated printer. Here, the printing system determines whether the printer object 412 is linked to the print port 413 of the printing system when the printer object 412 exists, and in a case where the printer object 412 is not linked, the print port 413 of the printing system is generated, and the print port 413 is linked to the printer object 412.

Next, in step S715, the print job management unit 409 sends the print job ID 512 and the printer object name 534 to the print request reception unit 414 of the printer control service 306. Furthermore, in step S716, the print job management unit 409 sends the document data, and the print job ID 512 to the printer object 412 of the spooler service 305. In step S717, the printer object 412 sends the document data to a PDL generation driver 411. In step S718, the PDL generation driver 411 converts the document data into PDL data, and sends the PDL data to the print port 413. Then, in step S719, the print port 413 notifies the print request reception unit 414 of the print control service 306 that the PDL data is ready, and also notifies of the job ID. In step S720, the print request reception unit 414 obtains the PDL data and sends the PDL data to the print data transmission unit 415. In step S721, the print data transmission unit 415 transfers the PDL data to the printers 110-112. The printers 110-112, having received the data perform printing in step S722. Then, the print control service 306 notifies the print job management unit 409 of this state. The print job management unit 409, through the database management unit 405, modifies in turn the status 513 of the print job information 511 to "waiting to be scheduled" (the state prior to transferring the data to the printers 110-112), "transferring", "transferred", and "printing".

Next, one of the printers 110-112, when the printing ends, sends the completion notification to the print control service 306 in step S610 or step S723. In step S611 or in step S724, the print control service 306 sends the print job ID 512 and a completion notification to the print job management unit 409 of the job management service 304. The print job management unit 409, through the database management unit 405, changes the status 513 of the print job information 511 to one of "printed", "error termination", or "cancel termination" Also, the print job management unit 409 generates the print history information 521 based on the print job information 511, and registers through the database management unit 405. A print job ID 522 of the print history information 521 and the print job ID 512 are the same values, and a completion status 523 is one of "printed", "error termination", "cancel termination". Also, a print completion date and time 524 is a date and time upon print completion, and a printer name 525 is the same value as the printer name 532 of the printer that performed the print.

<Printer Object Generation Flow>

FIG. 8 is a processing flow for when printing is executed by a print server in a case where printing is performed through a spooler service in one of the print servers. This shows the processing procedure of step S706-step S714 of FIG. 7A.

In step S801, it is determined whether the type of the document data of the printing target (document type) is PDF. In a case of PDF, the print job management unit 409 passes the printer name 532 to the registered printer management unit 410 and obtains the printer information 531. The registered printer management unit 410 obtains the printer information 531 based on the printer name 532 from the database management unit 405, and passes it to the print job management unit 409. Then, the print job management unit 409 determines the existence or absence of a PDF direct print function 538 of the printer information 531. Here, if the printing target is a PDF document, and there is the PDF direct function, the processing of FIG. 8 terminates, and processing is executed from step S607 of FIG. 6. Meanwhile, if the document of the printing target is not PDF, or if the PDF direct print function is not present, processing is executed from step S707 of FIG. 7A. Additionally, the determinations of step S801 and step S802 are tests of whether or not the document data of the printing target is printable without a printer driver, and if that is possible, the processing of FIG. 8 ends.

In a case where the printing target is not the PDF document or the PDF direct print function is not present for the printer to be used, and it is not PDL data, or in a case where the document type 506 is the application data format, or the PDF direct print function is not present in the designated printer even if there is the document type is PDF, the following processing is performed. Firstly, in step S804, it is determined if the printer object name 534 of the printer information 531 of the designated printer is empty. In a case where it is empty, i.e. in a case where the printer object 412 of the printer designated by the spooler service 305 does not exist, the print job management unit 409 outputs a new print port generation request of the printing system to the printer management unit 416 of the printer control service 306 in step S805. The printer management unit 416 outputs the print port generation request of the printing system to the spooler service 305. The spooler service 305 generates the print port 413 of the printing system. Then, in step S806, the print job management unit 409 sends the registration request of the printer object 412 corresponding to the designated printer to the printer management unit 416 of the printer control service 306. The printer management unit 416 sends to the spooler service 305 the registration request of the printer object 412 linked to the generated print port of the printing system. The spooler service 305 generates the printer object 412 linked to the designated print port of the printing system.

On the other hand, in a case where, in step S804, it is determined that the printer object name 534 is in the printer information 531, i.e. in a case where the printer object 412 exists for the spooler service 305, the print job management unit 409, in step S807, obtains information of the print port linked to the printer object name 534 from the spooler service 305 through the printer management unit 416, and determines whether the print port is the print port 413 of the printing system from the print port information that is obtained. In a case where it is not the print port 413 of the printing system, the print job management unit 409, in step S808, outputs a generation request for the print port 413 of the printing system for the spooler service 305 to the printer management unit 416. The printer management unit 416 outputs the print port 413 generation request of the printing system to the spooler service 305. The spooler service 305, in step S710, performs generation of the print port 413. Then, the print job management unit 409 outputs a setting modification request to link the printer object 412 to the print port generated by the spooler service 305 to the printer management unit 416. Furthermore, the printer management unit 416 outputs to the spooler service 305 a setting modification request to link the print port to the printer object 412. The spooler service 305 outputs the print port setting modification request to the printer object 412. Then, the printer object 412 links the newly generated print port to the printer object 412.

By the above procedure, in a case where the document data of the printing target is data for which a printer driver is required, and a printer object (i.e. a logical printer) corresponding to the designated printer is not in the print server, it can be generated newly in accordance with the print request. Also, in a case where a print port corresponding to the printer object is not present, it can be generated newly in accordance with the print request. In this way, because, for the print server, a printer object and/or a print port are generated in accordance with a print request which is a trigger for actually performing printing, upon expansion of the distributed printing system, printing can be executed without allocating a print port or preparing a printer object by a manual operation on the print server. Also, the correspondence relationship between print servers and printers becomes more flexible, and it is possible to raise a degree of freedom in selection of print servers by the load balancer.

Here, the Web application 302, the database service 303, the job management service 304, the spooler service 305, and the printer control service 306 may each be independent programs, and each can be arranged in separate information processing apparatuses. These programs are each arranged in information processing apparatuses connected to a network, and communication is performed between each of these programs. Also, it is possible to arrange these programs in the same information processing apparatus.

Above, explanation is given for processing, in a printing system of a distributed configuration for which a load balancer is arranged, for registering printers, and processing for holding document data input from another program or another service in the printing system, and explanation is given regarding a distributed printing system in which printing is performed, in response to a print request sent from the Web browser 301 upon a user operation, by one the print servers 103-105 by determining the necessity of a printer object depending on the document type, and generating a printer object in a case where the document type is such that the printer object is necessary. By generating the printer object dynamically based on the document type as described above, a printing system capable of scaling out, in which requests are distributed via a load balancer, can be realized.

Second Embodiment

Figure 10:
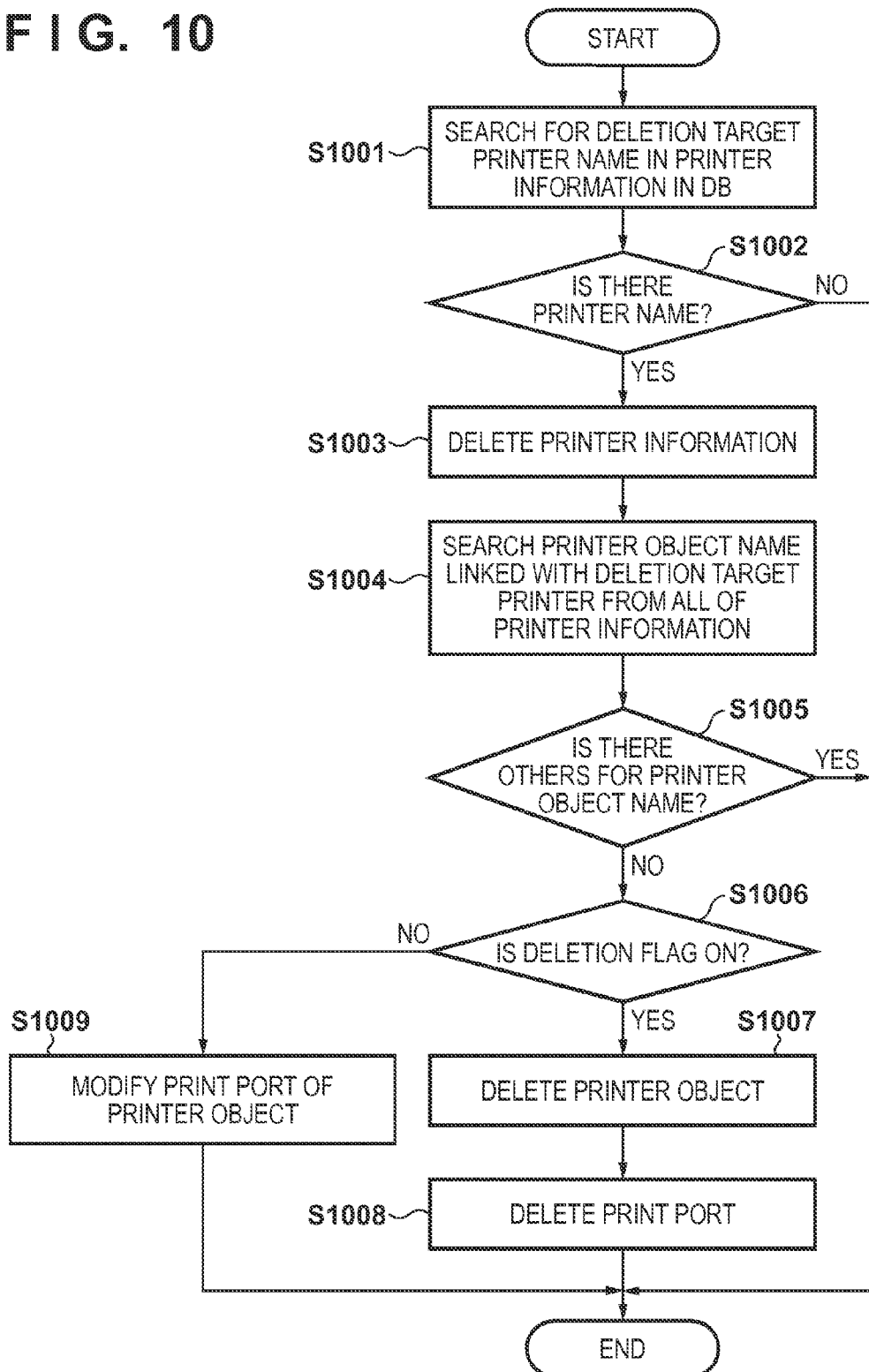
FIG. 10 is a flow for deletion of printer information and a printer object.

Here, explanation will be given using FIG. 9A, FIG. 9B, and FIG. 10 for printer deletion processing in the printing system of the present invention. In a case where a printer is removed from the distributed printing system of this embodiment, by deleting its printer information from the print server, it is possible to save resources, and the usage of a printer that does not exist can be prevented. For this, printer deletion processing, i.e. deletion of printer information is performed. Note, for the printer information of this embodiment, a deletion flag 901 as shown in FIG. 9A is newly added to the printer information of FIG. 5D. Accordingly, upon the registration of a printer, the deletion flag 901 is also designated. The deletion flag 901 is a flag indicating that a printer object registered in the printer information is also deleted upon the deletion of the printer information.

The printer information 531 of this printing system is managed in the storage 106 that the print servers 103-105 share. Also, the printer object 412 and the print port 413 are managed as resources of the spooler service 305 under the print servers 103-105. A printer deletion request from a client terminal is received by one of the print servers 103-105 through the print Web servers 107-109 via the load balancer. In the deletion request, a printer name which is a target of deletion is included. Firstly, the registered printer management unit 410 of the print servers 103-105, when the printer deletion request is received, searches for the printer name which is the target of the deletion from out of the printer information 531 through the database management unit 405 in step S1001. In step S1002, when the printer name 532 which is the target of the deletion exists in the printer information 531, the registered printer management unit 410, in step S1003, deletes the printer information 531 including the corresponding printer name through the database management unit 405. Additionally, configuration may be taken such that the printer object name 534, a host name 535, and the deletion flag 901 included in the printer information of the target of the deletion are temporarily stored prior to the deletion, and can be referenced after the deletion. In step S1004, the printer information 531 having a printer object name that coincides with the printer object name 534 of the deleted printer information 531 is searched for. In step S1005, it is determined if there are others, and if there are, deletion processing is terminated there. "if there are others" is a case in which other printer information using the same printer object upon printing is registered, and so the printer object is not deleted (the printer object is left).

In a case where there is no other printer information having the printer object name coincident with the printer object name 534 of the printer information 531 that is deleted, the deletion flag 901 that was saved is referenced in step S1006. This flag is a flag that a user using the previously described print settings of the printer object 412 sets so that the printing system does not delete the printer object 412 automatically (the printing system leaves the printer object 412). In step S1006, in a case where the deletion flag 901 is ON, firstly the printer object having the printer object name included in the printer information that is deleted is deleted in step S1007. For this, the registered printer management unit 410 requests the printer deletion by transmitting the printer object name 534 to be deleted to the printer management unit 416 of the print control service 306. The printer management unit 416 requests of the spooler service 305 the deletion of the printer object 412. The spooler service 305 executes the deletion of the designated printer object 412. Then, the registered printer management unit 410 registers the printer object name 534 of the printer object 412 for which deletion was requested to a printer object name 912 of deleted printer object information 911 (refer to FIG. 9B). Then, in step S1008, the print port having the host name 535 included in the deleted printer information 531 is deleted. For this, the print job management unit 409 outputs a deletion request for the designated print port to the printer management unit 416 of the printer control service 306. The printer management unit 416 outputs the deletion request for the designated print port to the spooler service 305. The spooler service 305 deletes the designated print port 413. Additionally, the deletion printer object information 911 is distributed by transmission to print servers other than the print server that received the printer deletion request and is merged with the deletion printer object information 911 that these print servers have.

Meanwhile, in a case where the deletion flag 901 is OFF in step S1006, the registered printer management unit 410, in step S1009, outputs, to the printer management unit 416, a request to modify the print port of the printer object 412 having the printer object name 534 registered in the printer information 531 that is deleted to the port (for example, an LPT port, or the like) registered by default in the OS. The printer management unit 416 outputs a port modification request for the corresponding printer object 412 to the spooler service 305. The spooler service 305 executes the port modification for the printer object 412. Up until this point is printer deletion processing by one of the print servers 103-105 which received the printer deletion request.

Regarding the others out of the print servers 103-105 which did not receive the printer deletion request, at a specific determined time the registered printer management unit 410 operates for regular processing that is performed at a fixed time one time each day, and references the printer object name 912 of the deleted printer object information 911 through the database management unit 405. Then, it is determined whether the printer object name 912 exists in the spooler service 305 through the printer management unit 416, and in a case where the printer object 412 exists, a deletion request is performed for that printer object. The deleted printer object information 911 may be deleted after the deletion of the corresponding printer object has completed.

Above deletion processing for a printer and a printer object by processing in the printing system is explained. With this, even in a distributed printing system configuration capable of being scaled out, the deletion of the printer object 412 of a print server that does not receive a request directly becomes possible. Also, it is possible for a user to designate whether or not to delete the printer object corresponding to the printer in addition to the deletion of the printer information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-036000, filed Feb. 26, 2014 which is hereby incorporated by reference herein in its entirety.

What is claimed is:

1. A print server for, making, by going through or without going through a printer object corresponding to a printer provided by a system, an instruction for printing by the printer, the print server comprising:
at least a processor and at least a memory coupled to the at least the processor and having stored thereon instructions, when executed by the at least the processor, and cooperating to act as:
a determination unit that determines whether or not document data to be printed is printable without going through a printer object corresponding to a designated printer, and,
that the document data is not printable without going through the printer object, determines whether or not the printer object corresponding to the designated printer exists; and
a unit that, in a case where it is determined by the determination unit that the printer object corresponding to the designated printer does not exist, causes the printer object to be generated by the system,
wherein the print server is one of a plurality of print servers, a print request from a client terminal being transmitted distributively to any one of the plurality of print servers by a load balancer,
the print server receives a predefined print request and generates the printer object,
the print server which has received a deletion request via the load balancer deletes the generated printer object and stores information indicating that the printer object has been deleted in a storage shared by the plurality of print servers, and
another print server which is one of the plurality of print servers and has generated a corresponding printer object corresponding to the print object deleted confirms that the printer object has been deleted based on the information stored in the storage and deletes the corresponding printer object according to confirmation that the printer object has been deleted.

2. The print server according to claim 1, wherein the determination unit, in a case where a type of the document data to be printed is such that a conversion is necessary in order to print by the designated printer, determines that the document data is not printable without going through the printer object corresponding to the designated printer.

3. The print server according to claim 2, wherein the determination unit, in a case where the type of the document data to be printed is a portable document format (PDF) and the designated printer has a function for printing the PDF, or the type of the document data to be printed is a page description language is processible by the designated printer, determines that the type of the document data to be printed is such that the conversion is not necessary in order to print by the designated printer; otherwise the determination unit determines that the type of the document data to be printed is such that the conversion is necessary in order to print by the designated printer.

4. The print server according to claim 1, further comprising a unit that, in a case where it is determined by the determination unit that the printer object corresponding to the designated printer does not exist, causes a print port corresponding to the designated printer to be generated by the system, and associates the print port with the generated printer object.

5. The print server according to claim 1, further comprising a unit that, in a case where it is determined by the determination unit that the printer object corresponding to the designated printer exists, determines an existence or absence of a print port associated with the printer object, and in a case of the absence, causes a print port to be generated by the system, and associate the generated print port with the printer object.

6. The print server according to claim 1, further comprising a unit that,
in a case where it is determined by the determination unit that the document data to be printed is printable without going through the printer object corresponding to the designated printer, transmits the document data as well as an instruction for printing to the designated printer, and in a case where it is determined by the determination unit that the document data to be printed is not printable without going through the printer object corresponding to the designated printer, transmits the document data to the printer object corresponding to the designated printer.

7. The print server according to claim 1, wherein the print server stores identification information of the deleted printer object in the storage as the information indicating that the printer object has been deleted.

8. The print server according to claim 1, further comprising a unit that, in accordance with a designation by a user, deletes printer information corresponding to the designated printer, and when the printer information is deleted, deletes a printer object associated with the deleted printer information in accordance with a setting designated in advance.

9. The print server according to claim 1, wherein the printer object is associated with a printer and a print setting, and in a case where the printer object receives the document data, the printer object converts the document data into a page description language by a printer driver of the printer, and transmits an instruction to print in accordance with the print setting to a corresponding printer.

10. A distributed printing system, comprising
a client terminal;
a print server for, making, by going through or without going through a printer object corresponding to a printer provided by a system, an instruction for printing by the printer;
a load balancer; and
a printer, wherein
the print server comprises:
at least a processor and at least a memory coupled to the at least the processor and having stored thereon instructions, when executed by the at least the processor, and cooperating to act as:
a determination unit that determines whether or not document data to be printed is printable without going through a printer object corresponding to a designated printer, and,
in a case where it is determined by the determination unit that the document data is not printable without going through the printer object, determines whether or not the printer object corresponding to the designated printer exists; and
a unit that, in a case where it is determined by the determination unit that the printer object corresponding to the designated printer does not exist, causes the printer object to be generated by the system,
wherein the print server is one of a plurality of print servers, a print request from a client terminal being transmitted distributively to any one of the plurality of print servers by a load balancer,
the print server receives a predefined print request and generates the printer object,
the print server which has received a deletion request via the load balancer deletes the generated printer object and stores information indicating that the printer object has been deleted in a storage shared by the plurality of print servers, and
another print server which is one of the plurality of print servers and has generated a corresponding printer object corresponding to the print object deleted confirms that the printer object has been deleted based on the information stored in the storage and deletes the corresponding printer object according to confirmation that the printer object has been deleted, the load balancer, implemented by a processor, is configured to transmit a print request from the client terminal to one of the plurality of print servers; and
the printer is configured to, in accordance with an instruction received from the print server, execute printing of document data.

11. A method of controlling a print server for, making, by going through or without going through a printer object corresponding to a printer provided by a system, an instruction for printing by the printer, the method comprising:
determining whether or not document data to be printed is printable without going through a printer object corresponding to a designated printer;
in a case where it is determined that the document data is not printable without going through the printer object, determining whether or not the printer object corresponding to the designated printer exists; and
in a case where it is determined that the printer object corresponding to the designated printer does not exist, causing the printer object to be generated by the system,
wherein the print server is one of a plurality of print servers, a print request from a client terminal being transmitted distributively to any one of the plurality of print servers by a load balancer,
the print server receives a predefined print request and generates the printer object,
the print server which has received a deletion request via the load balancer deletes the generated printer object and stores information indicating that the printer object has been deleted in a storage shared by the plurality of print servers, and
another print server which is one of the plurality of print servers and has generated a corresponding printer object corresponding to the print object deleted confirms that the printer object has been deleted based on the information stored in the storage and deletes the corresponding printer object according to confirmation that the printer object has been deleted.

12. A non-transitory computer readable storage medium storing a program therein, provided by an operating system, for causing a computer to execute a method of controlling printing for, making, by going through or without going through a printer object corresponding to a printer provided by a system, an instruction for printing by the printer, the method comprising:
determining whether or not document data to be printed is printable without going through a printer object corresponding to a designated printer;
in a case where it is determined that the document data is not printable without going through the printer object, determining whether or not the printer object corresponding to the designated printer exists; and
in a case where it is determined that the printer object corresponding to the designated printer does not exist, causing the printer object to be generated by the operating system,
wherein the print server is one of a plurality of print servers, a print request from a client terminal being transmitted distributively to any one of the plurality of print servers by a load balancer,
the print server receives a predefined print request and generates the printer object,
the print server which has received a deletion request via the load balancer deletes the generated printer object and stores information indicating that the printer object has been deleted in a storage shared by the plurality of print servers, and another print server which is one of the plurality of print servers and has generated a corresponding printer object corresponding to the print object deleted confirms that the printer object has been deleted based on the information stored in the storage and deletes the corresponding printer object according to confirmation that the printer object has been deleted.

* * * * *